United States Patent
Schneider et al.

(10) Patent No.: US 10,240,625 B2
(45) Date of Patent: Mar. 26, 2019

(54) ASSEMBLY UNIT

(71) Applicant: RICHARD BERGNER VERBINDUNGSTECHNIK GMBH & CO. KG, Schwabach (DE)

(72) Inventors: Wilhelm Schneider, Rednitzhembach (DE); Udo Schmidt, Schwabach (DE); Stefan Braun, Maebenberg (DE)

(73) Assignee: Richard Bergner Verbindungstechnik GmbH & Co. KG, Schwabach (DE)

( * ) Notice: Subject to any disclaimer, the term of this patent is extended or adjusted under 35 U.S.C. 154(b) by 174 days.

(21) Appl. No.: 15/453,077

(22) Filed: Mar. 8, 2017

(65) Prior Publication Data

US 2017/0292555 A1    Oct. 12, 2017

(30) Foreign Application Priority Data

Mar. 8, 2016   (DE) .......................... 10 2016 002 655

(51) Int. Cl.
| | |
|---|---|
| *F16B 21/18* | (2006.01) |
| *B21D 53/36* | (2006.01) |
| *F16B 41/00* | (2006.01) |
| *F16B 5/02* | (2006.01) |

(52) U.S. Cl.
CPC ............ *F16B 21/183* (2013.01); *B21D 53/36* (2013.01); *F16B 41/002* (2013.01); *F16B 5/02* (2013.01)

(58) Field of Classification Search
CPC ........ F16B 5/02; F16B 5/0208; F16B 21/125; F16B 21/18; F16B 21/183; F16B 41/002; B21D 53/36

USPC ........ 411/347, 352, 353, 358, 360, 516–517, 411/917, 999
See application file for complete search history.

(56) References Cited

U.S. PATENT DOCUMENTS

| | | | |
|---|---|---|---|
| 3,221,794 A * | 12/1965 | Acres ................... | F16B 41/002 411/353 |
| 3,395,194 A | 7/1968 | Keckler et al. | |
| 6,174,118 B1 * | 1/2001 | Rebers .................. | F16B 37/041 411/107 |
| 6,379,093 B1 * | 4/2002 | Bondarowicz .......... | F16B 21/18 411/353 |
| 6,582,171 B2 * | 6/2003 | Bondarowicz .......... | F16B 21/18 411/353 |
| 6,688,826 B2 * | 2/2004 | Agha .................... | F16B 41/002 411/107 |
| 6,769,851 B2 * | 8/2004 | Agha .................... | F16B 41/002 411/161 |

(Continued)

*Primary Examiner* — Roberta S Delisle
(74) *Attorney, Agent, or Firm* — Laurence A. Greenberg; Werner H. Stemer; Ralph E. Locher

(57) ABSTRACT

An assembly unit has an assembly part with an assembly side and an opposite outer side. A through opening extends from the outer side to the assembly side. A screw has a head that juts radially over the through opening on the outer side and a shank which reaches through the through opening with radial clearance. The screw has a threaded portion and a non-threaded portion disposed between the threaded portion and the head. A holder fixes the screw captively in the through opening. The holder is held axially movably in the through opening and axially movably on the non-threaded shank portion of the screw. The holder has a disk-shaped flange with a flange opening reached through by the non-threaded shank of the screw.

12 Claims, 10 Drawing Sheets

(56) References Cited

U.S. PATENT DOCUMENTS

2003/0108401 A1\* 6/2003 Agha .................... F16B 41/002
  411/353

\* cited by examiner

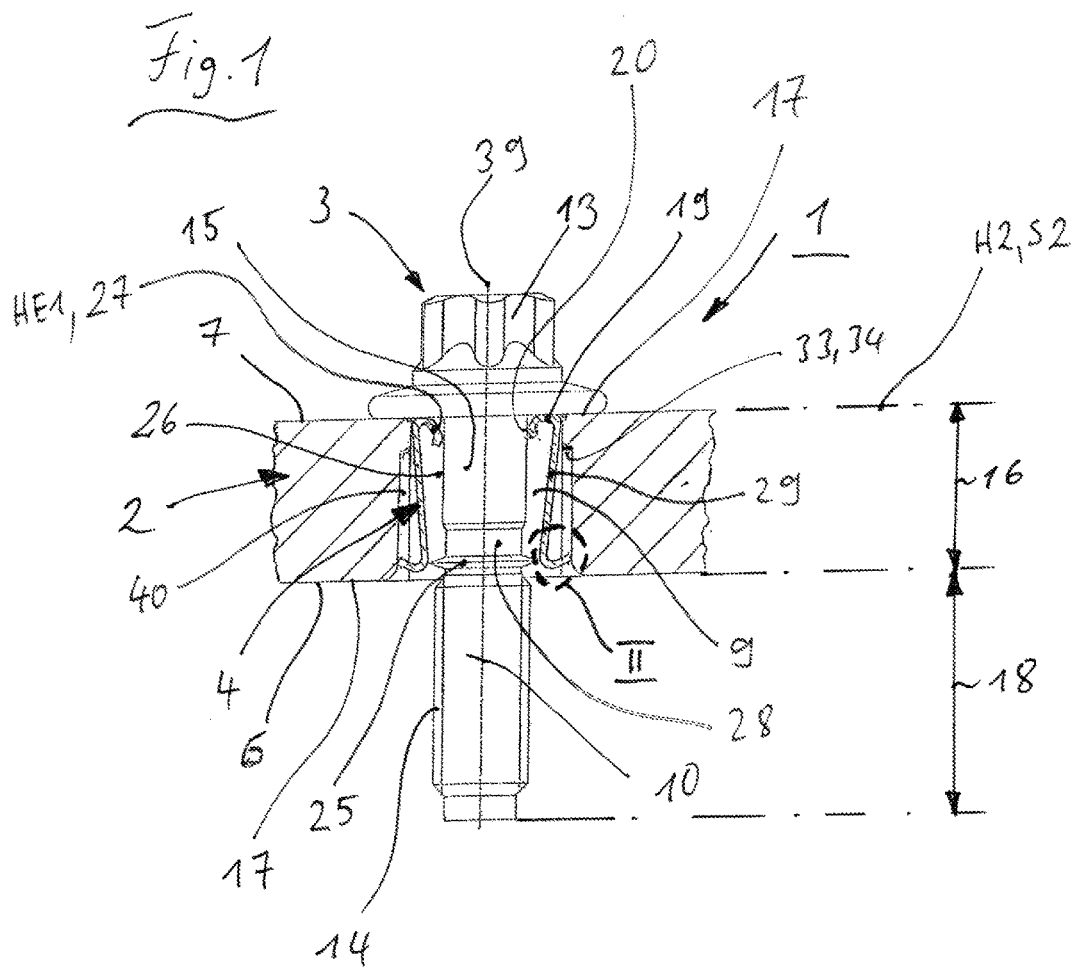
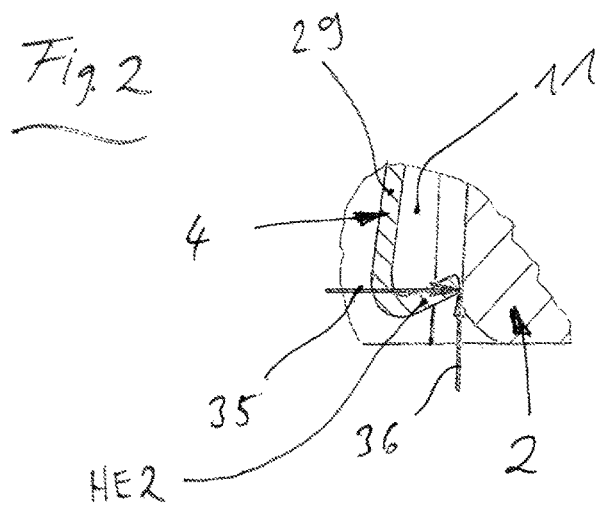

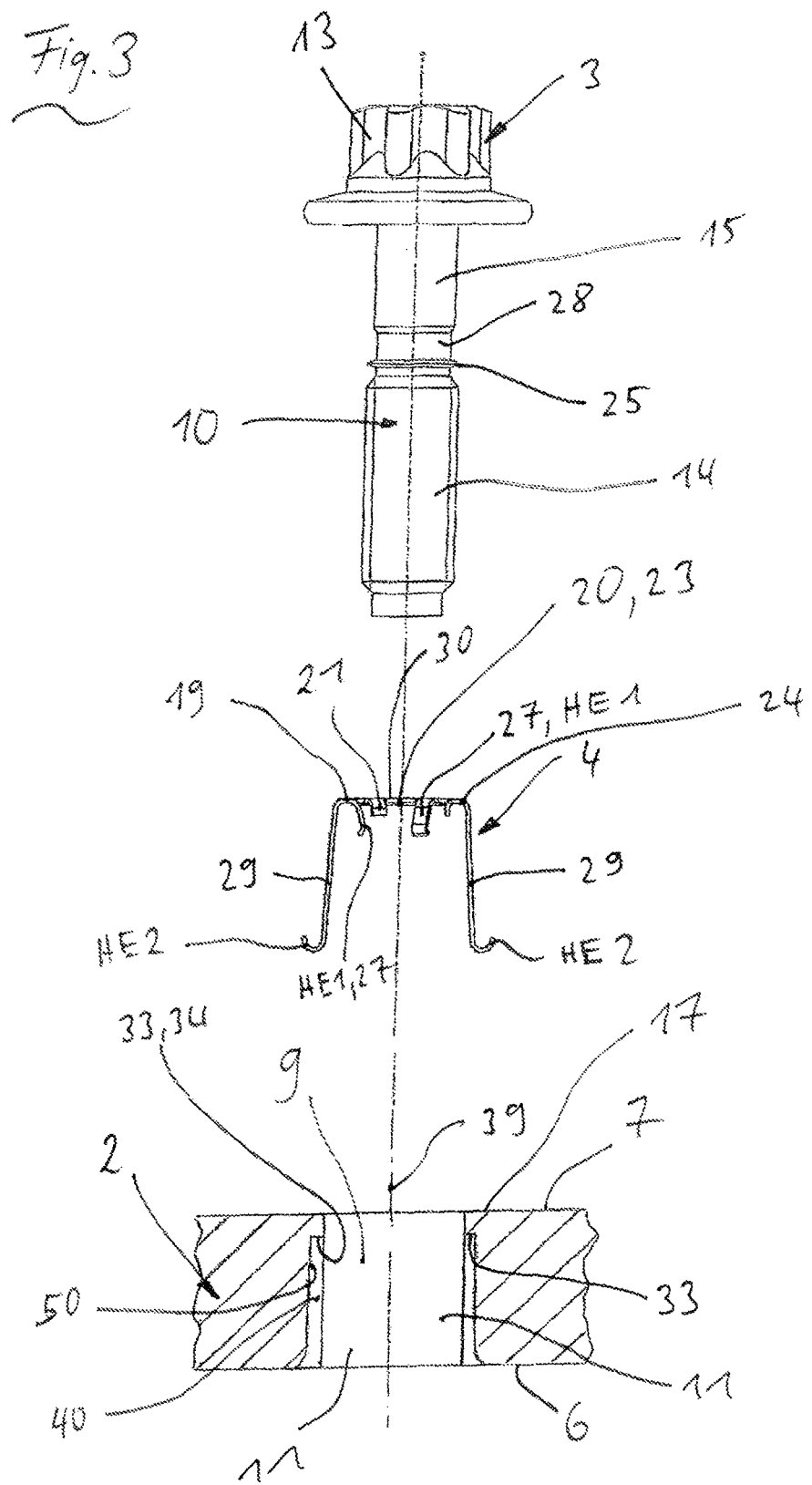

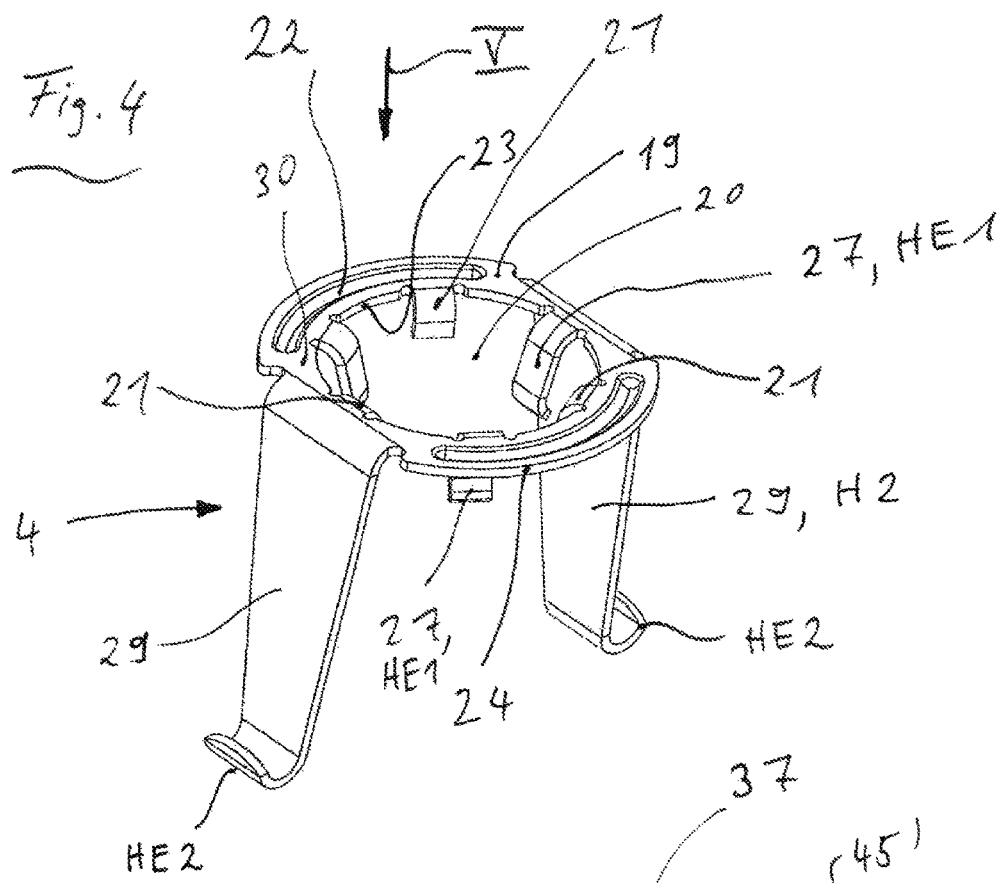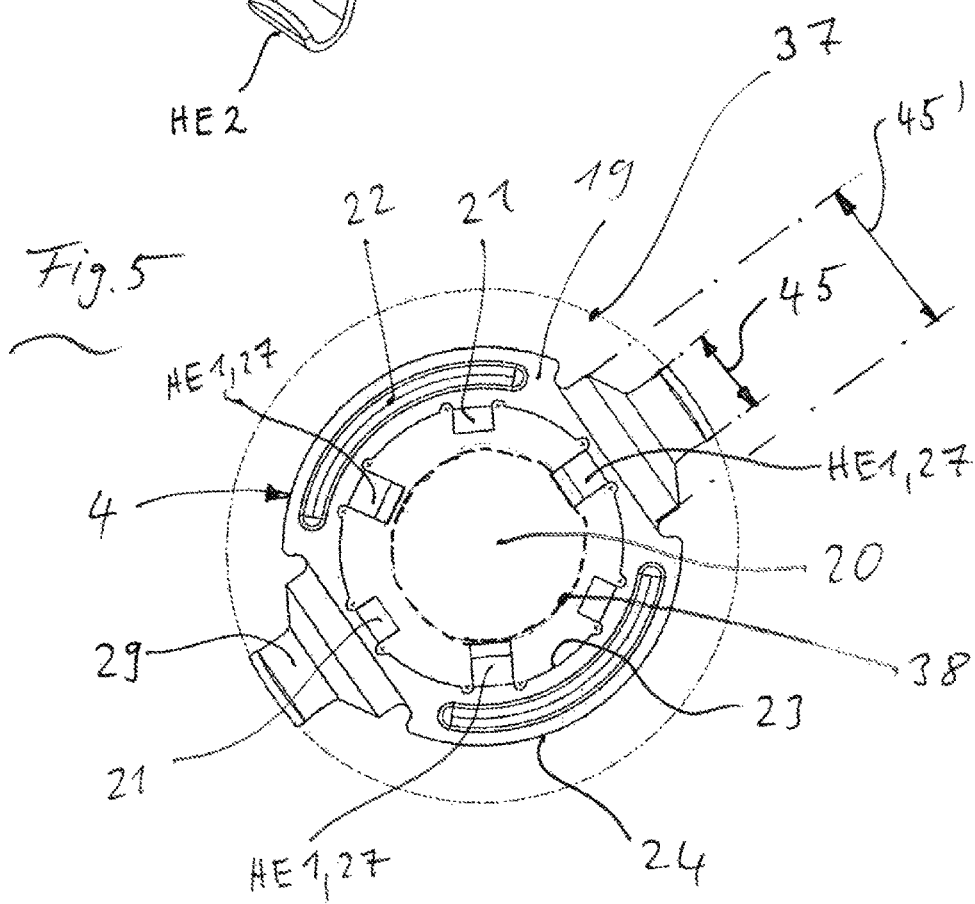

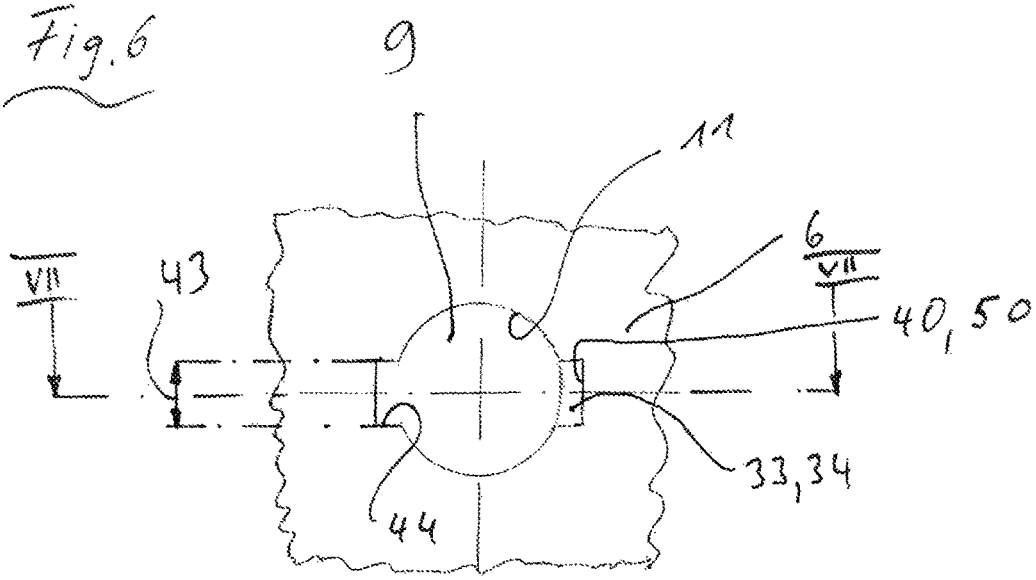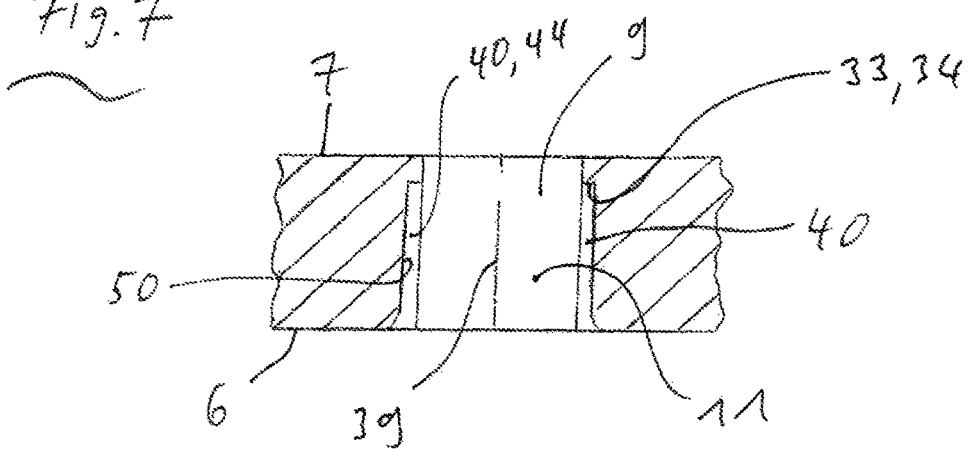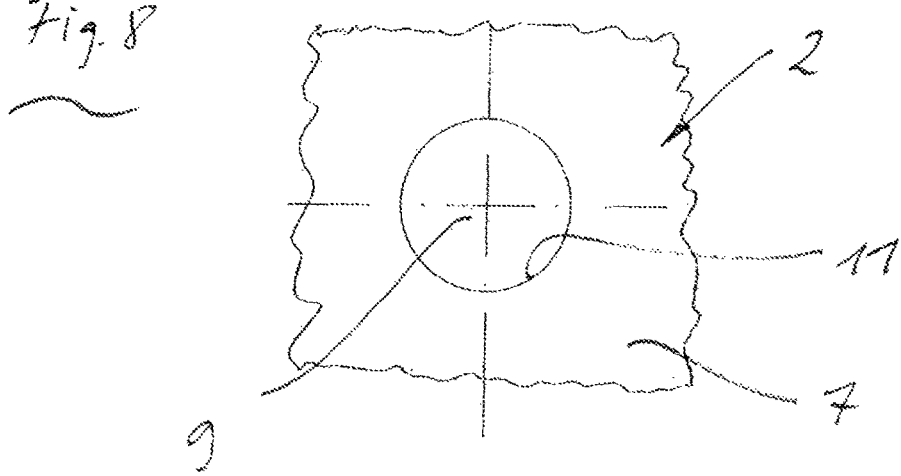

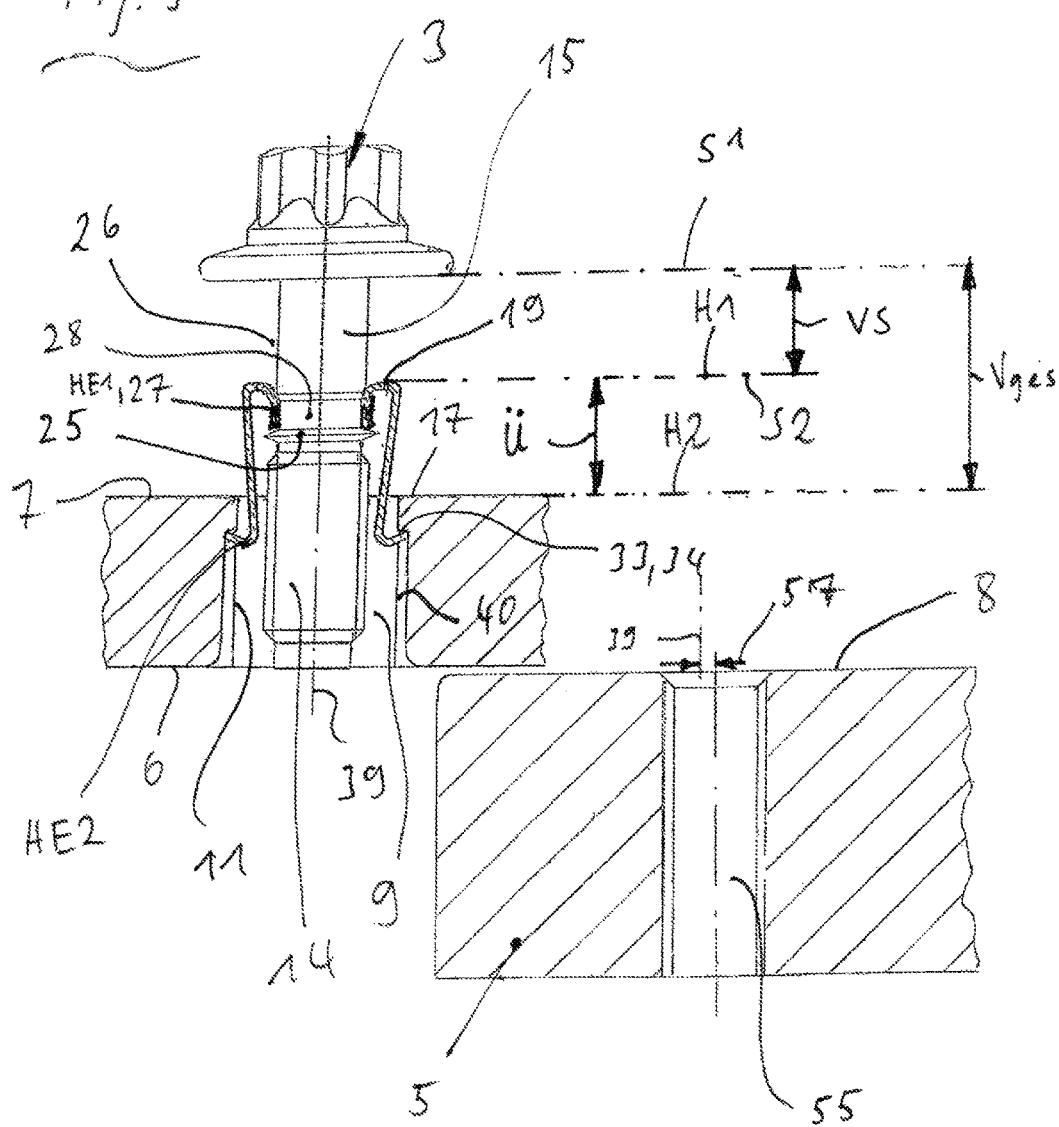

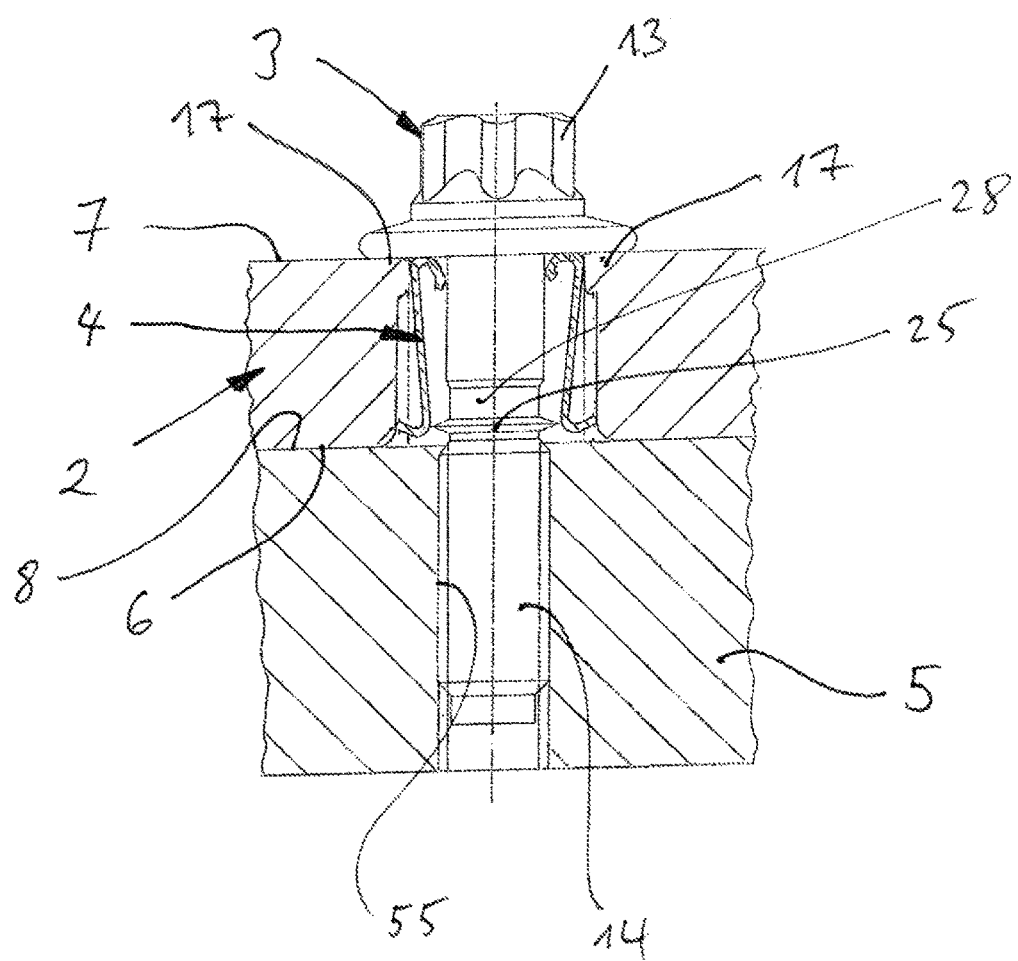

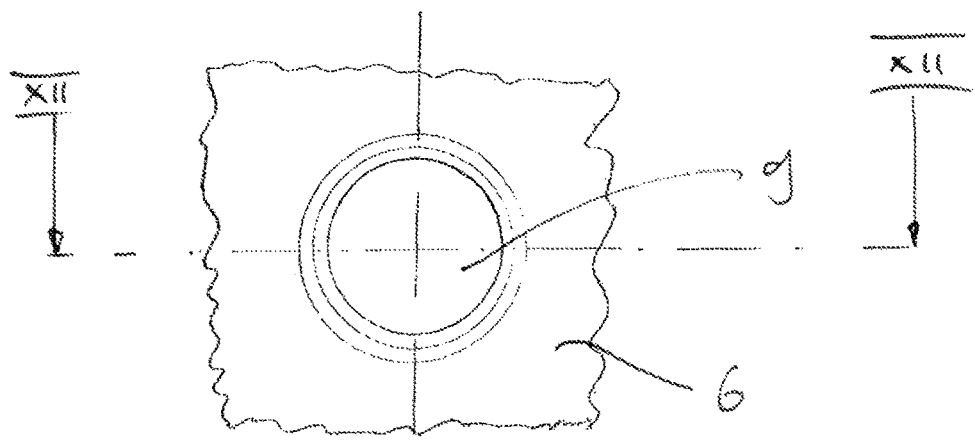
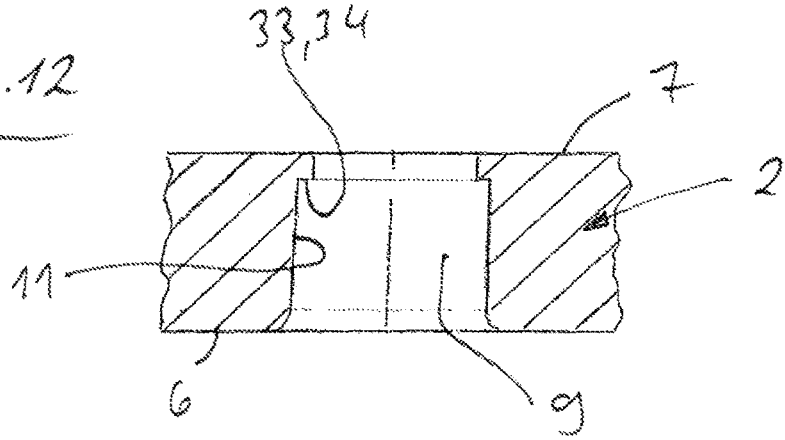
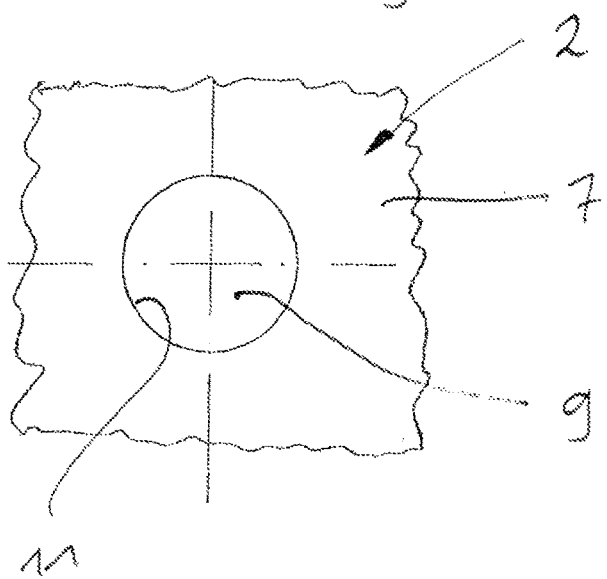

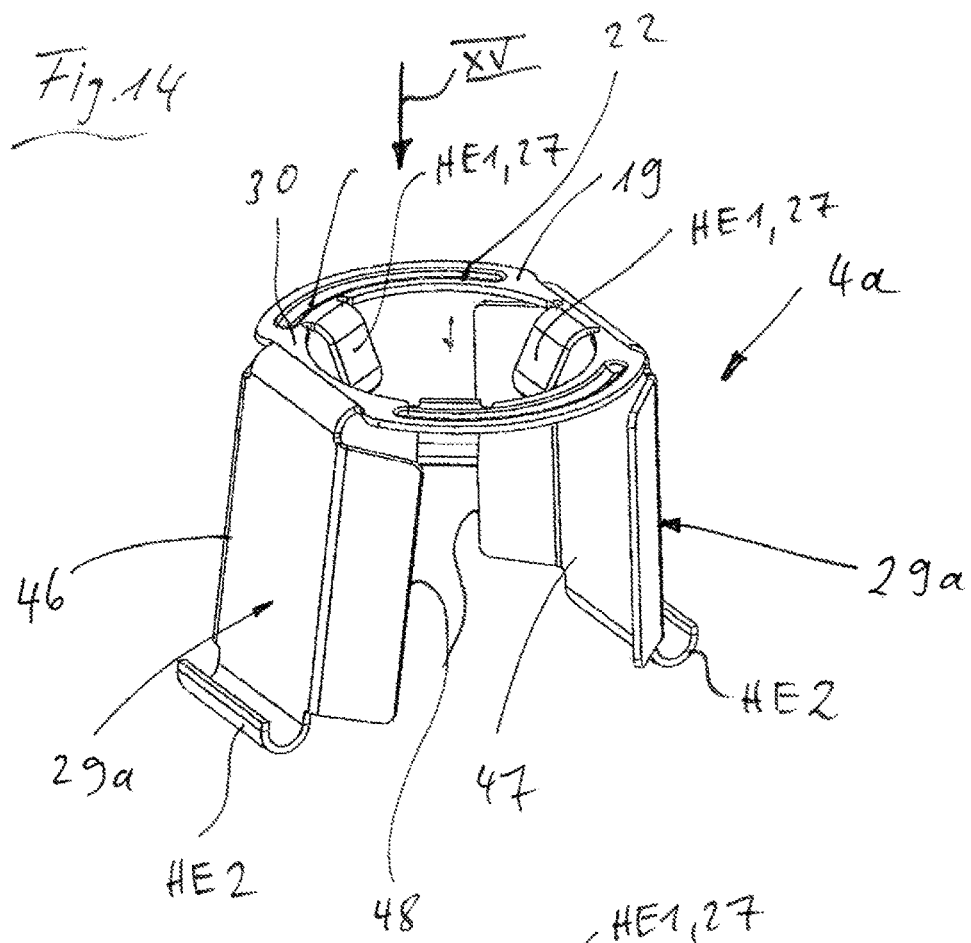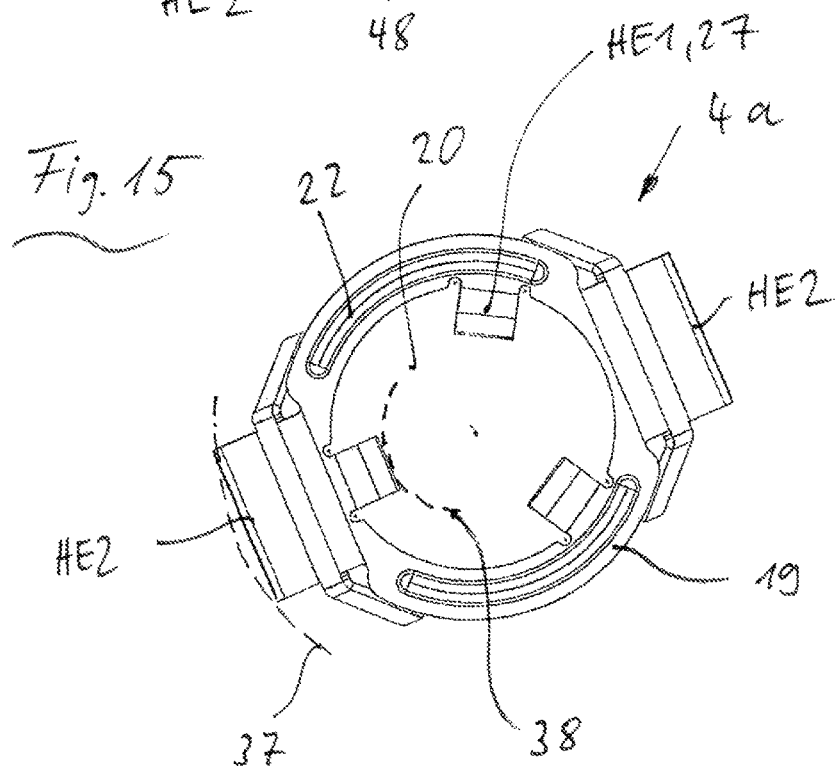

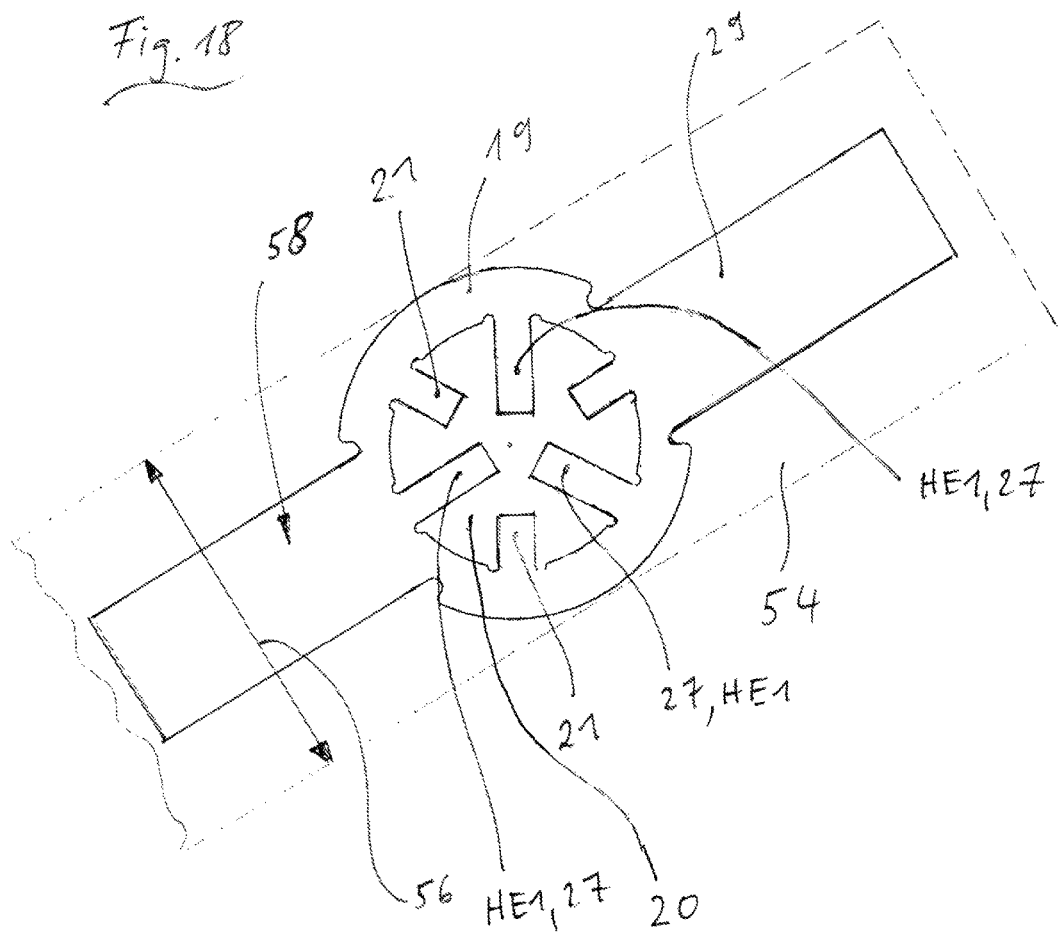

ASSEMBLY UNIT

BACKGROUND OF THE INVENTION

Field of the Invention

The invention relates to an assembly unit, which comprises an assembly part to be fixed to a basic structure, a screw, and a holder which captively connects the screw to the assembly part. The screw, which has a head and a shank provided with a threaded portion, reaches with the shank through a through opening extending from an outer side of the assembly part to an opposite assembly side, which latter, in the assembled state, is facing toward the basic structure.

The function of the holder consists, apart from the aforementioned captive retention, in ensuring an axial mobility of the screw such that the screw can be pushed from the assembly side out of the through opening to the extent that its threaded portion does not project, or projects with a least possible projecting length, from the assembly side of the assembly part. An assembly unit equipped with one or more screws can therefore be mounted in the course of the assembly onto a basic structure, wherein the screws are displaced into said position and the assembly side comes to lie on a corresponding mating surface. In the assembled state, thus once the assembly part is fixed to the basic structure, the holder does not participate in the transmission of the pretensioning force of the screw into the basic structure.

For instance, U.S. Pat. No. 3,395,194 discloses an assembly unit in which, as the holder, a collar made of an elastomer is used. The collar is disposed within the through bore and is penetrated by the threaded portion of the screw. Both on its inner side facing toward the threaded portion and on its outer side pointing toward the wall of the through opening, the collar has a deformable contour, whereby the screw or its thread portion is held by non-positive or frictional engagement in an axially displaceable manner in the through opening. Apart from the use of a plastic which restricts the possible applications, in this design the low retaining force of the collar is disadvantageous. A captive fixing of the screw to the assembly part during the transport and handling of the assembly unit is therefore not reliably ensured. A further drawback is that, due to the collar which bears closely against the wall of the through opening and against the threaded portion, a lateral assembly clearance between screw and assembly part is barely present, which lateral assembly clearance is enabled in the case of an axial offset between the through opening and a threaded bore of the basic structure.

BRIEF SUMMARY OF THE INVENTION

Starting from the above, the object of the invention is to propose an alternative assembly unit which in particular is improved with respect to said drawbacks.

This object is achieved by an assembly unit as claimed. The holder comprises as the main body a disk-shaped flange having a flange opening which is reached through by the non-threaded shank of the screw and which is bounded by an inner rim. The flange itself is delimited by an outer rim.

The relative axial mobility of holder and screw is ensured by virtue of the fact that the inner rim forms a first retaining element or at least bears a first retaining element, wherein the latter juts into an undercut space extending between the head of the screw and a shank projection axially distanced therefrom. The shank projection is here formed, for instance, by that end of the threaded portion which is facing toward the head or by an element, for example an annular projection, which projects from the non-threaded shank portion.

Onto the outer rim of the flange are molded a plurality of spring arms, which are spaced apart in the peripheral direction thereof and extend away toward the head-remote shank end, wherein these spring arms bear at their free end a radially outwardly protruding second retaining element. In a first axial end position of the holder, the second retaining element or elements make contact with a stop element, projecting radially inward from the wall of the through opening, on that side thereof which is facing away from the screw head. In said first axial end position, the holder projects with maximum projecting length from the outer side of the assembly part.

The maximum displacement distance by which the screw, in the course of the fitting of the assembly part on a basic structure, can be pushed from the assembly side out of the through opening is thus obtained from said maximum projecting length of the holder and the displacement distance of the screw in relation to the holder. Thus even in the case of assembly parts having a small thickness, an axial positioning of the screw, in which it projects with its threaded portion not at all, or only slightly, from the assembly side of the assembly part, is possible.

A further advantage of the invention consists in the fact that both the first retaining element and the spring arms respectively bearing a second retaining element can be flexibly configured such that a radial or relative movement, extending transversely to the longitudinal center axis of the through bore, between the flange of the holding part and the spring arms, as well as between the first retaining element and the screw shank, is enabled. A screw which reaches through the flange with its shank is therefore radially movable, so that an axial offset between the through opening of the assembly part and the threaded bore of the basic structure can be compensated.

The proposed assembly unit is advantageous also from a production engineering aspect. Since the first retaining element is disposed on the inner rim and the spring arms are disposed on the outer rim of the flange, the holder can be produced in a simple manner in a punching-bending process. In this, a blank shape is firstly punched out of a flat material, which blank shape virtually corresponds to a development of the holder in the plane, and then the first retaining element and the spring arms are bent into their intended spatial position by means of a bending operation. The production of the holder is particularly material-saving when this has only two diametrically opposing spring arms. A flat material strip having a small width, which namely corresponds to the external dimension of the flange, can then namely be used as the parent material.

BRIEF DESCRIPTION OF THE SEVERAL VIEWS OF THE DRAWING

The invention is now described in greater detail with reference to the appended drawings, wherein:

FIG. 1 shows a sectional representation of an assembly unit with assembly part, screw and holder, FIG. 2 shows the detail II from FIG. 1, FIG. 3 shows an exploded representation of the assembly unit from FIG. 1, FIG. 4 shows the holder from FIG. 1 in perspective representation.

FIG. 5 shows a top view in the direction of the arrow V in FIG. 4,

FIG. 6 shows a top view of the assembly side of the assembly part,

FIG. 7 shows a cross section in accordance with the line VII-VII in FIG. 6,

FIG. 8 shows a top view of the outer side of the assembly part,

FIG. 9 shows a sectional representation showing the mounting of an assembly unit onto a basic structure, FIG. 10 shows an assembly unit connected to a basic structure, FIG. 11 shows an assembly part, the through opening of which has a different cross-sectional shape from the assembly part of FIGS. 6 to 8, FIG. 12 shows a cross section in accordance with the line XII-XII in FIG. 11, FIG. 13 shows a top view of the outer side of the assembly part, FIG. 14 shows a holder which is modified in relation to FIG. 4, FIG. 15 shows a top view in the direction of the arrow XV in FIG. 14, FIG. 18 shows an intermediate product in the production of a holder in a punching-bending process.

DESCRIPTION OF THE INVENTION

Figure 16:
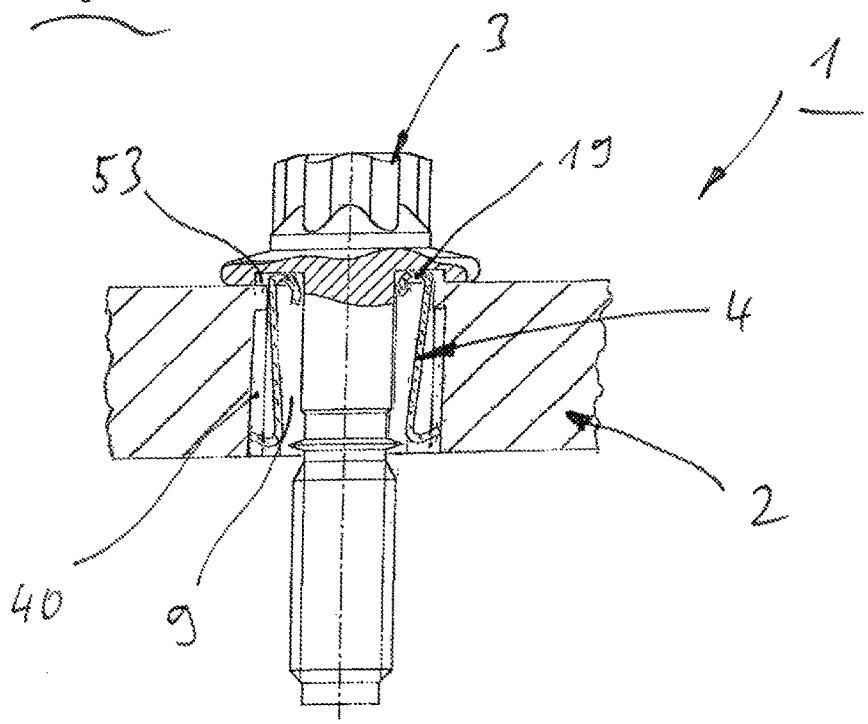
FIG. 16 shows an assembly unit which is modified in relation to FIG. 1, in sectional representation.

The assembly unit 1 shown in FIG. 1 comprises an assembly part 2, a screw 3 and a holder 4. The assembly part 2, which is intended for fixing to a basic structure 5 (FIG. 9, 10), has an assembly side 6 and an outer side 7 facing away therefrom. In the final assembly state, the assembly side 6 bears against a mating surface 8 of the basic structure 5 or is facing toward this same. The assembly part 2 is penetrated by at least one through opening 9, wherein the latter extends from the outer side 7 to the assembly side 6 or opens out into said sides. As can be seen from the figures, the cross-sectional area of the through opening 9 has a preferably circular basic shape, i.e. its wall 11 runs—viewed in the peripheral direction—at least partially on a circular cylinder. Other cross-sectional areas, for example rectangular, are also conceivable however.

The screw 3 has a shank 10 and a head 13. The head 13 is dimensioned such that it juts radially over the through opening 9 and, at least in the final assembly state (FIG. 10), bears against the outer side 7 of the assembly part 2. The shank 10 has a threaded portion 14 and a non-threaded shank portion 15 disposed between said threaded portion and the head 13. The length of the shank 10 is greater than the thickness 16 of the assembly part 2 at the hole rim region 17 encompassing the through opening 9. When the head 13 bears against the outer side 7 of the assembly part 2, the shank 10 therefore projects with a maximum projecting length 18 from the assembly side 6. The shank 10 reaches through the through opening 9 with radial clearance, such that between the wall 11 of said through opening and the shank 10 there is space present to receive the holder 4.

The holder 4 fixes the screw 3 captively in the through opening 9, wherein it is held axially displaceably both in the through opening 9 of the assembly part 2 and on the non-threaded shank portion 15. It comprises a disk-shaped flange 19, which thus extends substantially in one plane, having a central flange opening 20 reached through by the non-threaded shank portion 15 of the screw 3. The flange 19 has an inner rim 23, which bounds the flange opening 20, and an outer rim 24, which outwardly delimits said flange. The inner rim 23 is configured as at least one first retaining element HE1, which juts into an undercut space 26, extending between the screw head 13 and a shank projection 25 axially distanced therefrom, of the non-threaded shank portion 15. Consequently, the screw 3 is axially displaceable in relation to the holder 4, between a first axial position S1 (FIG. 9) and a second axial position S2, by a displacement path VS. In the first axial position S1, the screw 3 projects with a maximum projecting length Ü, corresponding to the displacement path VS, from the flange 19 of the holder 4, wherein the first retaining element HE1 bears against a side, facing the screw head 13, of the shank projection 25, which latter is preferably configured as an annular projection. In the second axial position S2, the flange 19 bears against the bottom side of the screw head 13 (FIG. 1).

In order to ensure the holding function of the retaining element HE1, it is sufficient that the inner rim 23 of the flange 19 overlaps the shank projection 25 or juts into the undercut space 26. In order to facilitate the fitting of the holder 4 on the screw shank 10, a marginal region of the flange 19, which extends radially outward away from the inner rim 23, can be provided with radially running slots (not shown). In a preferred embodiment, however, a plurality of, for instance 3, retaining lugs 27, which are spaced apart in the peripheral direction of the flange 19, are molded onto the inner rim 23, wherein said retaining lugs project from the bottom side, pointing away from the screw head 13, of the flange 19. In the original state of the holder, thus when this is not yet connected to the screw 3, the retaining lugs 27 project radially inward to the extent that, when the screw shank 10 is placed into the flange opening 20, they are bent radially outward and, by virtue of elastic restoring forces, press against the non-threaded shank portion 15.

For the stiffening of the flange 19, this has on its inner rim 23 molded-on stiffening lugs 21, which project radially inward and from the flange bottom side. Beads 22 made in the flange 19 likewise have a stiffening function.

In the first axial position S1, the screw 3, by virtue of the first retaining elements HE1 which press against the non-threaded shank portion 15, is fixed by frictional engagement to the basic structure 5 during the fitting of the assembly part 2. This positional fixing of the screw can be optimized by means of a latching of the holder 4 to the non-threaded shank portion 15. Said shank portion has a latching depression, in which the first retaining element HE1 or the retaining lugs 27 resiliently engage. The latching depression is preferably configured as an annular groove 28 extending around the shank periphery. For its production, no additional production step is necessary, since it is formed by a rolling operation in the creation of the shank projection.

Onto the outer rim are molded a plurality of spring arms 29, which are spaced apart in the peripheral direction of the flange 19, preferably two diametrically opposing spring arms which extend away toward the head-remote shank end. These bear on their free end a radially outwardly protruding second retaining element HE2, which in particular is formed by the fact that the free ends of the spring arms 29 are bent over in the shape of a hook. In a first axial position H1, in which the holder 4 projects with maximum projecting length Ü from the outer side 7 of the assembly part 2, the second retaining element HE2 bears against a stop element 33, projecting radially inward from the wall 11 of the through opening 9, on that side of said stop element which is facing away from the screw head 13. The stop element 33 is preferably configured as a shoulder 34 pointing toward the assembly side 6 of the assembly part 2.

Apart from the function of holding the screw 3 captively on the assembly part, the holder 4 also has the function of centering the screw 3 in the through hole 9. This is ensured in particular when the spring arms 29 are elastically configured and, by virtue of an elastic restoring force 35, press against the wall 11 of the through opening 9, so that in the first axial position H1, the holder 4, together with the screw 3 supported against it, is held with an axially acting retaining force 36 by frictional engagement in the through opening 9.

The restoring force 35 of the spring arms 29 derives from the fact that the free ends of the spring arms 29, in the non-fitted original state of the holder 4, are spaced further apart than in the installed state. In other words, the diameter of a circumcircle 37 circumscribing the free ends (FIG. 5) is greater than the distance between those regions of the wall 11 of the through opening 9 against which the spring arms 29 press. Comparable relationships obtain in respect of the first retaining elements HE1 configured as retaining lugs 27. In the original state of the holder 4, the diameter of an inscribed circle 38 bearing against the retaining lugs 27 is smaller than the diameter of the non-threaded shank portion 15.

The holder 4 shown in FIG. 4 is particularly suitable for an assembly part 2 in which, in the wall 11 of the through opening 9, axial grooves 40 running in the direction of the longitudinal center axis 39 of said through opening and having parallelly running side walls 44 are present, wherein each axial groove 40 is assigned to a spring arm 29. In the case of two spring arms 29, two diametrically opposing axial grooves 40 are thus present. At least the free end of the spring arms 29 juts into the axial grooves 40. The distance 43 between the side walls 44 of the axial grooves 40 is slightly greater than the width 45 of the free ends of the spring arms 29 (FIG. 5, 6). In this way, the holder 4, upon an axial displacement in relation to the assembly part 2, is guided in a tilt-stable manner in the axial grooves 40. When the axial groove 40 receives the spring arm 29 in the whole of its length, it is expedient if the spring arm 29 has a uniform width, thus if it does not—as shown in FIG. 4—taper in the direction of its free end. The abovementioned shoulder 34, which cooperates with the second retaining element HE2 at the free ends of the spring arms 29 and serves as a stop element 33, is disposed within the axial grooves 40.

In FIG. 14 is shown a holder 4a, which, like that of FIG. 4, has two diametrically opposing spring arms 29a. However, these are arched transversely to their longitudinal extent, i.e. they form a channel running in their longitudinal extent, which channel has a convex side 46, facing toward the wall 11 of the through opening 9, and a concave side 47, facing toward the screw shank 10. The holder 4 is particularly suitable for insertion in a through opening 9 which has no axial grooves 40 for the tilt-stable axial guidance of the holder 4a. The through opening has a, for instance, circular cross-sectional area. The stop element 33 cooperating with the second retaining element HE2 of the spring arms 29 of the holder 4a is a shoulder 34 extending over the whole of the periphery of the through opening 9 (FIGS. 11 to 13). The tilt stabilization is here achieved by virtue of the fact that, during an axial tilting of the holder 4a, the spring arms 29a are supported (not shown) with their side edges 48 against the wall 11 of the through opening 9.

Figure 17:
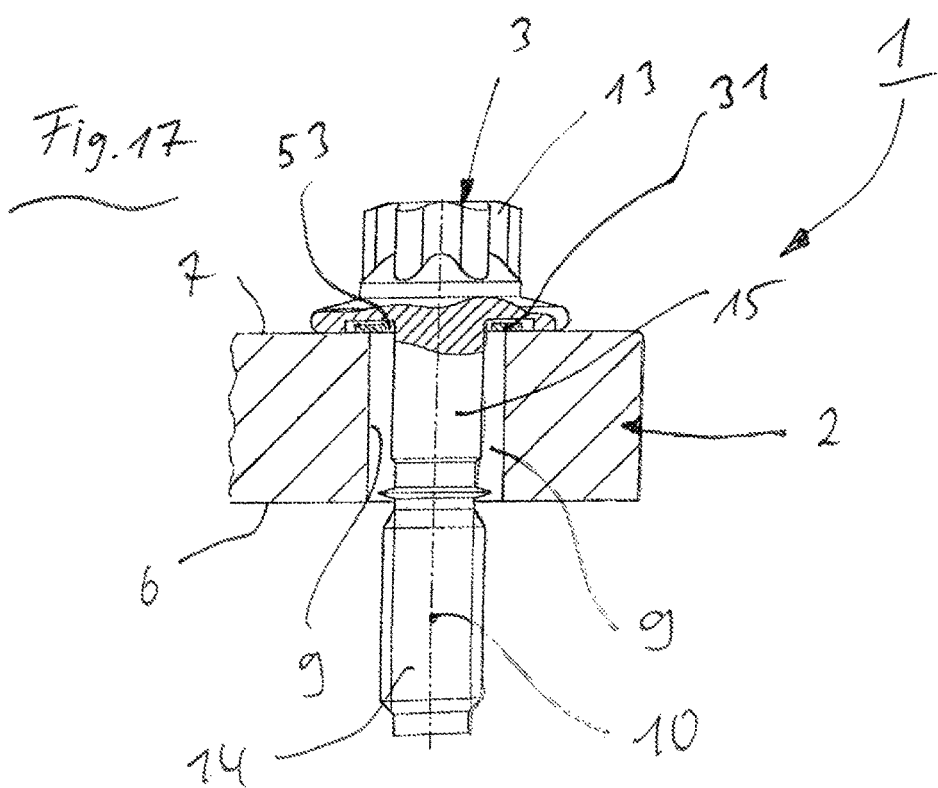
FIG. 17 shows the assembly unit from FIG. 15, rotated through 90°.

The second axial position H2 of the holder 4 in relation to the assembly part 2 and the second axial position S2 of the screw 3 in relation to the holder 4 are respectively given when the head 13 of the screw 3 rests with its bottom side on the outer side 7 of the assembly part (FIGS. 1, 10, 16). For the holder 4, two possibilities are given with respect to the axial position H2:

a) The flange 19 of the holder 4 is dimensioned such that it fits into the through opening 9. The holder 4 is then disposed fully within the through opening 9. In order that the spring arms 29 do not jut out of the assembly side 6 of the assembly part 2, the length of the holder 4 is smaller than the thickness 16 of the assembly part 2 in the hole rim region 17 of the through opening 9 (FIGS. 1, 10).

b) The flange 19 of the holder 4 is dimensioned such that it rests at least partially on the outer side 7 of the assembly part 2 (FIGS. 16, 17). In order in this case likewise to prevent the spring arms 29 from jutting out of the assembly side 6, these have a length which is smaller than the thickness 16 of the assembly part 2 measured in the hole rim region 17 of the through opening. In order that the screw head 13, in the final assembly state according to FIG. 10, can impinge directly on the outer side 7 of the assembly part 2, in its bottom side is made a recess 53, which receives within it the flange region 54 disposed on the outer side 7 of the assembly part 2.

In order to fix an assembly unit 1 to a basic structure, it is mounted onto the mating surface 5, with a feed motion roughly vertical thereto, on the mating surface 8 of the basic structure 5. The screw 3, which according to FIG. 1 projects with the projecting length 18 from the assembly side 6 and stands on the mating surface 8, is here displaced relative to the assembly part 2 into its axial position S1 and, through the interaction of shank projection 25 and first retaining element HE1, the holder 4 is displaced into its axial end position H1. In the last-named position, the two retaining elements HE2 of the spring arms 29 bear against the stop element 33 of the wall 11 of the through bore 9, the screw shank 10 does not project beyond the assembly side 2 of the assembly part 2. The total displacement path $V_{ges}$ is here obtained from the displacement path VS of the screw 3 in relation to the holder 4 and the maximum projecting length Ü with which the holder 4 projects from the outer side 7 of the assembly part 2 (FIG. 9).

If a feeding of the assembly unit 1 to the basic structure 5 at right angles to the mating surface 8 thereof is not possible for spatial reasons, or if a screw shank 10 projecting from the assembly side 6 would be troublesome for other reasons, in the assembly the procedure as indicated in FIG. 9 is adopted, i.e. the assembly unit 1 is fed parallel to the mating surface 8. The screw 3 and the holder 4 are already in the axial position S1 and H1 respectively. The spring arms 29 are here pressed with their free ends or with the retaining elements HE2 which are present there, by virtue of elastic restoring forces, against the wall 11 of the through opening 9 or the groove bottom 50 of the axial grooves 40, such that the holder 4, by virtue of the friction and despite that weight of the screw 3 that bears down on it, remains in the axial position H1. As a result of the first retaining elements HE1 or retaining lugs 27, which are likewise resiliently pretensioned against the non-threaded shank portion, and the resulting frictional engagement, the screw 3 is held in the axial position S1. Additionally or alternatively, the latching engagement of the retaining lugs 27 in the annular groove 28 takes effect.

In the case of an axial offset 57 between the longitudinal center axis 39 of the through opening 9 and a threaded bore 55 of the basic structure 5, which threaded bore receives the threaded portion 14 of the screw 3, the screw 3 can be laterally or radially offset in the through bore 9 by virtue of the elasticity of the spring arms 29.

The holder 4 is a punched-bent part, which is produced from a, for instance, strip-shaped flat material blank 54. From the flat material blank 54 is punched out a blank shape 58 of the holder 4, in which the subsequent spring arms 29, retaining lugs 27 and stiffening lugs 21 run in the plane of the flat material blank 54. If the holder 2 has mutually opposing spring arms 27, as the flat element blank merely a material strip, the width 56 of which is determined only by the dimension of the flange 19, is necessary. The material waste component is thereby reduced. In a machining step following the punching-out of the blank shape 58, the spring arms 29, the stiffening strips 21 and the retaining lugs 27 are bent out of the plane into their intended position, and at the free ends of the spring arms 29 the second retaining elements HE2 are created.

REFERENCE SYMBOL LIST

1 assembly unit
2 assembly part
3 screw
4 holder
5 basic structure
6 assembly side
7 outer side
8 mating surface (on 5)
9 through opening
10 shank
11 wall
13 head
14 threaded portion
15 non-threaded shank portion
16 thickness (of 2)
17 hole rim region
18 max. projecting length (of 4)
19 flange
20 flange opening
21 stiffening lugs
22 bead
23 inner rim
24 outer rim
25 shank projection
26 undercut space
27 retaining lugs
28 annular groove
29 spring arm
30 top side (of 19)
31 flange region
33 stop element
34 shoulder
35 elastic restoring force
36 retaining force
37 circumcircle
38 inscribed circle
39 longitudinal center axis (of 9)
40 axial groove
43 distance
44 side wall
45 width (of 29)
46 convex side
47 concave side
48 side edge (of 29)
50 groove bottom
53 recess (in 49)
54 flat material blank
55 threaded bore
56 width
57 axial offset
58 blank shape
HE1 first retaining element
HE2 second retaining element
Ü projecting length
S1 first axial position (of 3)
H2 second axial position (of 4, 4*a*)

The invention claimed is:

1. An assembly unit, comprising:
an assembly part, having an assembly side, an outer side opposite said assembly side, and a through opening extending between said outer side and said assembly side;
a screw, having a head projecting radially above said through opening on said outer side and a shank reaching through said through opening, said shank having a threaded portion and a non-threaded portion disposed between said threaded portion and said head;
a holder fixing said screw captively in said through opening, said holder being held with axial movability in said through opening and with axial movability on said non-threaded shank portion of said screw;
said holder having a disk-shaped flange with a flange opening accommodating said non-threaded portion of said shank, an inner rim bounding said flange opening and an outer rim delimiting said flange;
said inner rim forming at least one first retaining element, which juts into an undercut space extending between said head of said screw and a shank projection at an axial spacing distance from said head;
a plurality of spring arms molded onto said outer rim, said spring arms being spaced apart in a peripheral direction of said flange and extending away toward a shank end distal from said head, said spring arms having free ends bearing a radially outwardly protruding second retaining element, which, in a first axial position, in which said holder projects with a maximum projecting length from said outer side of the assembly part, bears against a stop element projecting radially inward from a wall of said through opening, on a side of said stop element facing away from said head of said screw.

2. The assembly unit according to claim 1, wherein said spring arms comprise two diametrically opposing spring arms.

3. The assembly unit according to claim 1, wherein said free ends of said spring arms, by virtue of elastic restoring forces, press against the wall of said through opening.

4. The assembly unit according to claim 1, wherein said free ends of said spring arms are bent in a hook shape, thereby forming said second retaining elements.

5. The assembly unit according to claim 1, wherein said spring arms are arched transversely to a longitudinal extent thereof, said spring arms have a convex side, facing toward the wall of said through opening, and a concave side, facing toward said screw shank, and wherein side edges of said spring arms pointing in the peripheral direction of said through opening cooperate with the wall of said through opening for ensuring a tilt stabilization of said holder.

6. The assembly unit according to claim 1, wherein the wall of said through opening is formed with axial grooves running in a direction of a longitudinal center axis of said through opening, wherein each of said axial groove is assigned to a spring arm for axially guiding at least a respective said free end thereof, and wherein respectively said stop element that cooperates with said retaining element of said spring arm is disposed within the respective said axial groove.

7. The assembly unit according to claim 1, wherein said at least one first retaining element, by virtue of elastic restoring forces, presses against said non-threaded shank portion of said screw.

8. The assembly unit according to claim 7, wherein said at least one first retaining element, in a first axial position of said screw, engages in a latching depression formed in said non-threaded shank portion of said screw.

9. The assembly unit according to claim 1, wherein said first retaining element is formed by a plurality of retaining lugs that are spaced apart in the peripheral direction of said flange and project from a bottom side of said flange.

10. The assembly unit according to claim 1, wherein said flange is dimensioned such that, in a second axial position of said holder, said flange rests at least partially on said outer side of the assembly part.

11. The assembly unit according to claim 1, wherein said flange is dimensioned such that, in a second axial position of said holder, said flange is disposed within said through opening.

12. The assembly unit according to claim 1, wherein said holder is a punched and bent part.

\* \* \* \* \*